United States Patent
Deguchi et al.

(10) Patent No.: US 10,114,363 B2
(45) Date of Patent: Oct. 30, 2018

(54) NUMERICAL CONTROLLER CAPABLE OF PARTIAL CORRECTION OF MACHINING CYCLE

(71) Applicant: FANUC Corporation, Minamitsuru-gun, Yamanashi (JP)

(72) Inventors: Yuuji Deguchi, Minamitsuru-gun (JP); Akira Egashira, Minamitsuru-gun (JP); Hideaki Maeda, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 142 days.

(21) Appl. No.: 15/000,136

(22) Filed: Jan. 19, 2016

(65) Prior Publication Data
US 2016/0224014 A1  Aug. 4, 2016

(30) Foreign Application Priority Data
Jan. 29, 2015  (JP) ................. 2015-014917

(51) Int. Cl.
G05B 19/00 (2006.01)
G05B 19/408 (2006.01)
(52) U.S. Cl.
CPC ........... *G05B 19/4083* (2013.01); *G05B 2219/36043* (2013.01); *G05B 2219/50299* (2013.01)
(58) Field of Classification Search
CPC ...... G05B 19/4083; G05B 2219/36043; G05B 2219/50299
See application file for complete search history.

(56) References Cited

U.S. PATENT DOCUMENTS

| | | | | |
|---|---|---|---|---|
| 4,628,442 A * | 12/1986 | Isobe | ................. | G05B 19/4093 700/180 |
| 5,043,644 A * | 8/1991 | Sasaki | ................. | G05B 19/4068 318/568.1 |
| 5,270,940 A * | 12/1993 | Shinozaki | ........ | G05B 19/40937 318/568.1 |
| 5,513,113 A * | 4/1996 | Okada | ................. | G05B 19/404 483/11 |

(Continued)

FOREIGN PATENT DOCUMENTS

| | | |
|---|---|---|
| CN | 103302369 A | 9/2013 |
| CN | 103419198 A | 12/2013 |

(Continued)

OTHER PUBLICATIONS

Notification of Reasons for Refusal dated Nov. 22, 2016 in Japanese Patent Application No. 2015-0149176 (4 pages) with an English Translaiton (3 pages).

(Continued)

*Primary Examiner* — Ronald D Hartman, Jr.
(74) *Attorney, Agent, or Firm* — Drinker Biddle & Reath LLP

(57) ABSTRACT

A numerical controller generates a machining cycle, and controls a machine tool by executing the machining cycle. A block to be corrected is selected from among a plurality of blocks of the machining cycle, the selected block is corrected, and correction information of the block is generated based on the correction and stored. Then, the machining cycle is generated based on the correction information of the stored block and the machining cycle is executed.

18 Claims, 8 Drawing Sheets

(56) References Cited

U.S. PATENT DOCUMENTS

| | | | | |
|---|---|---|---|---|
| 5,793,635 A | * | 8/1998 | Niwa | G05B 19/406 |
| | | | | 318/570 |
| 6,970,764 B2 | * | 11/2005 | Harada | G05B 19/4093 |
| | | | | 318/568.1 |
| 2002/0002417 A1 | * | 1/2002 | Irie | B23H 7/065 |
| | | | | 700/162 |
| 2013/0238114 A1 | | 9/2013 | Hiraga et al. | |
| 2013/0317646 A1 | | 11/2013 | Kimoto | |

FOREIGN PATENT DOCUMENTS

| | | |
|---|---|---|
| JP | H01-166205 A | 6/1989 |
| JP | H04-307605 A | 10/1992 |
| JP | H07-311612 A | 11/1995 |
| JP | H08-57747 A | 3/1996 |
| JP | 2005-108077 A | 4/2005 |
| JP | 2013-175129 A | 9/2013 |

OTHER PUBLICATIONS

The Notification of the First Office Action dated Mar. 22, 2018 in Chinese Patent Application No. 2016100671132 (5 pages) with an English translation (8 pages).

* cited by examiner

→ COMMANDED CUTTING PATH
--▶ COMMANDED RAPID-TRAVERSE PATH
⇒ CORRECTED CUTTING PATH

→ COMMANDED CUTTING PATH
⇒ ADDED CUTTING PATH

●OPERATION 1

BLOCK OF ROUGHLY TURNING CYCLE BEFORE CORRECTION
G1120 R A B ····· X Y** ;

●OPERATION 2

●OPERATION 3

BLOCK OF ROUGHLY TURNING CYCLE AFTER CORRECTION
G1120 R A B ····· X Y** N12 (X1:34.5, Z1:−106.635);

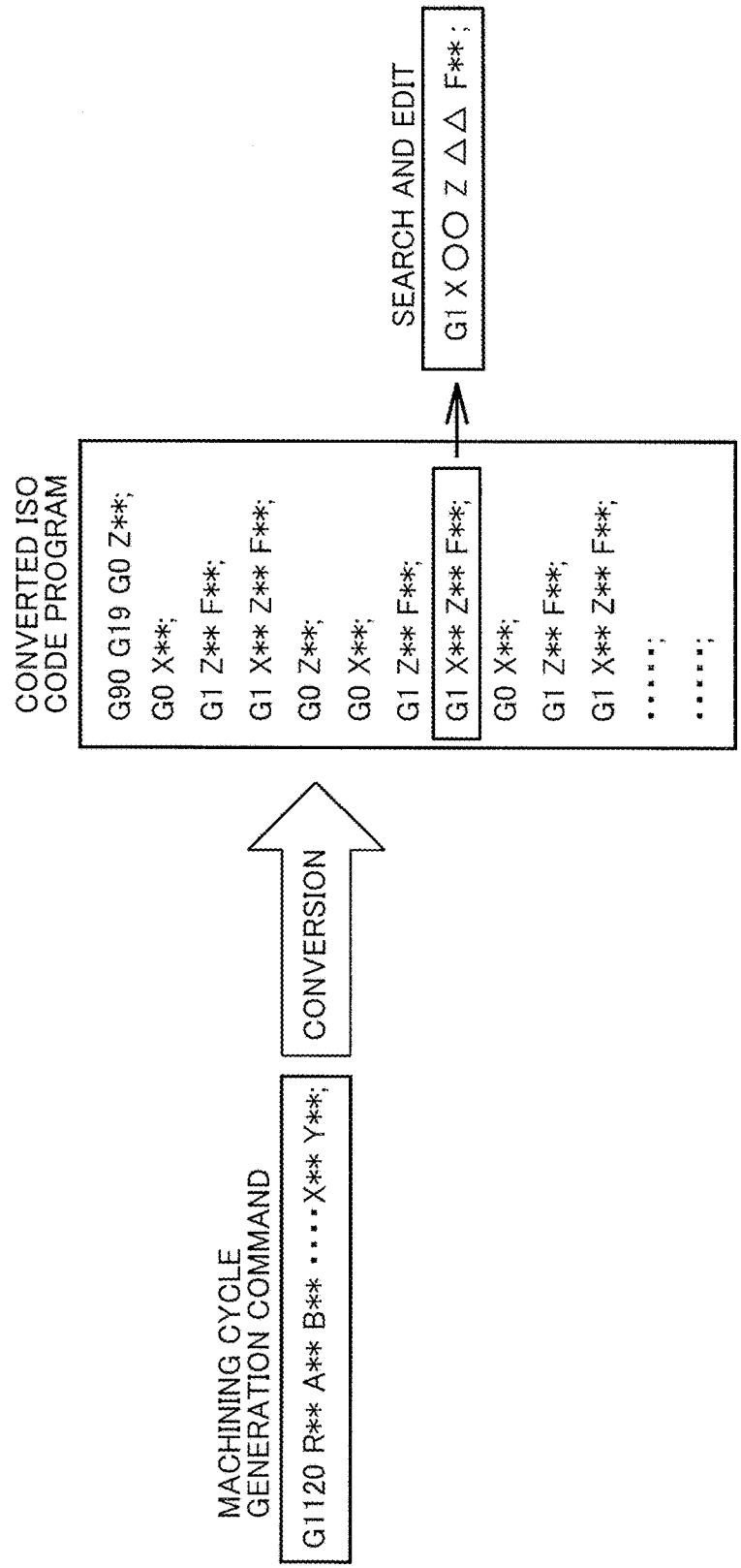

NUMERICAL CONTROLLER CAPABLE OF PARTIAL CORRECTION OF MACHINING CYCLE

RELATED APPLICATION DATA

This application claims priority under 35 U.S.C. § 119 and/or § 365 to Japanese Application No. 2015-014917 filed Jan. 29, 2015, the entire contents is incorporated herein by reference.

BACKGROUND OF THE PRESENT INVENTION

1. Field of the Present Invention

The present invention relates to a numerical controller, and particularly to a numerical controller which is capable of partially correcting a tool path (a cutting condition) according to a machining target component in a machining cycle.

2. Description of the Related Art

A numerical controller has a function of generating and executing a machining cycle based on a machining cycle generation command contained in a machining program. According to the machining cycle generated by such a function, the numerical controller controls drive axes for a tool to be cyclically operated. However, there maybe needed to partially correct the cycle motion of the tool for the purpose of improvement of machining accuracy.

Conventionally, in a case where the partial correction of the machining cycle is reflected on a machining program, as illustrated in FIG. 9, the machining cycle is converted into an ISO code program, and then a correction target block in the converted program is searched and directly edited.

As a conventional technology related to the machining cycle, Japanese Patent Application Laid-Open No. 2013-175129 discloses a numerical controller which changes and stores a cutting condition (a spindle speed, a feed rate, and a cutting amount) in the middle of execution of the machining cycle, and executes the machining cycle under the changed cutting condition from the next execution.

In a machining cycle function of the typical numerical controller, the machining cycle is built in system software for the numerical control. Since the machining cycle is generated and output based on a machining shape by the machining cycle function, an operator cannot directly apply the partial correction to the machining cycle. Therefore, in the above-described conventional method, when a tool path of the machining cycle is partially corrected, the machining cycle is converted into the ISO code program once, and then directly edited. However, the block to be corrected is necessarily specified from the replaced ISO code program, which is a burden to the operator and it is easy to cause an erroneous correction.

On the other hand, in the technology of Japanese Patent Application Laid-Open No. 2013-175129, since the cutting condition can be changed in the middle of execution of a machining cycle, the problem of the conventional method can be alleviated to some degree. However, even when the spindle speed or the feed rate are changed using the technology, the tool path is not changed. In addition, even when the tool path is changed by changing the cutting amount, the tool path after the changed place is changed from the original tool path instructed by the machining program. Therefore, only a partial spot of the tool path cannot be changed.

SUMMARY OF THE PRESENT INVENTION

An object of the present invention is to provide a numerical controller which can designate a portion to be corrected and correct the portion in a case where a tool path is to be partially corrected according to a machining target component in a machining cycle, without unfolding the machining cycle into the ISO code program for the direct edition.

The numerical controller according to the present invention generates a machining cycle configured by a plurality of blocks in response to a machining cycle generation command of a machining program, and controls a machine tool by executing the machining cycle. The numerical controller includes a correction block select unit that selects, from among the plurality of blocks of the machining cycle, a block to be corrected a block correction unit that corrects the block selected by the correction block select unit, and generates correction information of the block based on the correction, and a correction information storage unit that stores the correction information of the block. The machining cycle is generated based on the correction information of the block stored in the correction information storage unit and the machining cycle is executed.

The correction block select unit may be configured to select the block to be corrected from a screen where a machining path based on the machining cycle is drawn, or may be configured to select the block stopped by a single block in the middle of execution of the machining cycle, as the block to be corrected. The block correction unit may be configured to correct an end point coordinate value of the selected block based on a coordinate value instructed by a manual operation, may be configured to correct an end point coordinate value of the selected block based on a coordinate value designated on a screen where a machining path based on the machining cycle is drawn, may be configured to correct an end point coordinate value of the selected block based on a coordinate value acquired by a key input, or may be configured to correct a cutting condition of the selected block based on an input value of a cutting condition acquired by a key input.

The correction information of the block may include block identification information for identifying the block, and the correction information of the block may be directly instructed based on the block identification information as an argument of the machining cycle generation command.

According to the present invention, an operator does not have to manually convert the machining cycle into the ISO code, so that the operator can simply designate and edit a correction target block from among a plurality of blocks of the machining cycle, and the path of the machining cycle can easily be corrected partially.

BRIEF DESCRIPTION OF THE DRAWINGS

The forgoing and other objects and feature of the present invention will be apparent from the following description of preferred embodiments of the present invention with reference to the accompanying drawings, in which:

FIG. 9 is a diagram for describing a partial correction method of the machining cycle according to the conventional technology.

DETAILED DESCRIPTION OF THE PREFERRED EMBODIMENTS

In the present invention, there is provided a numerical controller including the following units to reflect a tool path of the machining cycle. With this configuration, in a case where a tool path (a cutting condition) is partially corrected according to a machining target component in a machining cycle, the tool path is corrected by designating a portion to be corrected at the time of machining simulation (at the time of execution of the machining cycle) without unfolding the machining cycle into the ISO code program for the direct edition.

Figure 1:
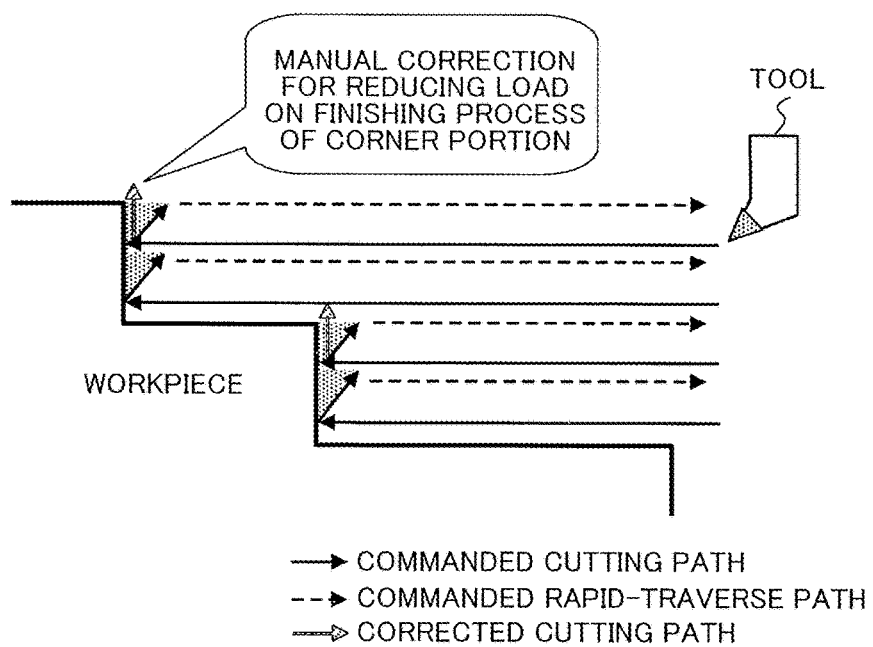
FIG. 1 is a diagram illustrating an example of a partial correction process (end point coordinate correction) of a machining cycle which is performed by a numerical controller according to the present invention.
Figure 2:
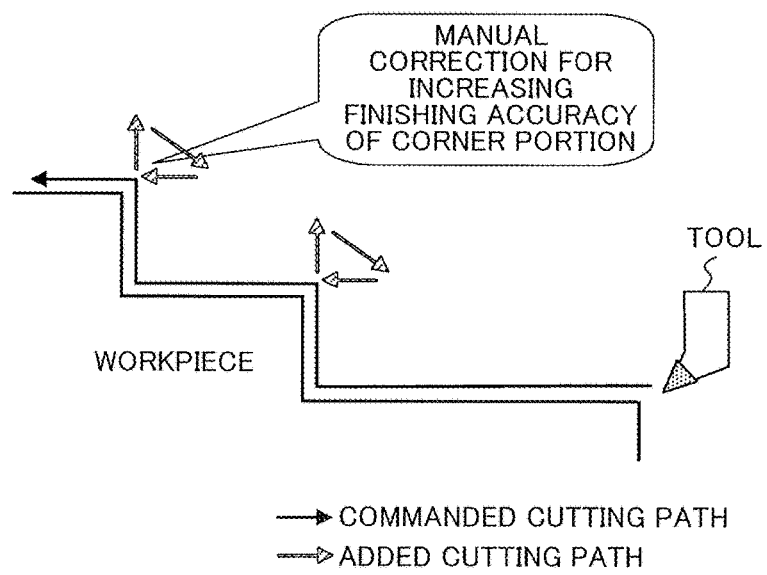
FIG. 2 is a diagram illustrating an example of the partial correction process (machining path insertion) of the machining cycle which is performed by the numerical controller according to the present invention.

Unit 1: a correction block select unit which selects, from among a plurality of blocks generated in the machining cycle, a block to be corrected Unit 2: a block correction unit which corrects the block selected by the correction block select unit Unit 3: a correction information storage unit which stores correction information of the block corrected by the block correction unit Unit 4: a unit which generates and performs the machining cycle based on the correction information of the block stored by the correction information storage unit With these units introduced to the numerical controller, various partial corrections such as a partial correction of the tool path (the cutting condition) by an end point coordinate correction for reducing a load in a finishing of a corner portion as illustrated in an example of FIG. 1, and a partial correction of the tool path (the cutting condition) by a machining path insertion for the purpose of increasing a finishing accuracy of a corner portion as illustrated in an example of FIG. 2 can be reflected on the machining cycle in which a cutting process is repeatedly performed on a workpiece.

Specific operation outlines of the present invention will be described using FIG. 3.

<Operation Example>

Operation 1: a drawing of the machining cycle is performed in a drawing check screen.

Operation 2: a correction line segment is designated in a single block and a soft-key [Correction] is pressed, and coordinate values to be corrected are input to end point coordinates of a displayed window and a soft-key [Reflection] is pressed.

Operation 3: a correction place is reflected on the machining cycle.

Operation 4: when a machining cycle generation command to which correction information is added is executed, the machining cycle on which the correction block is reflected is performed.

Figure 4:
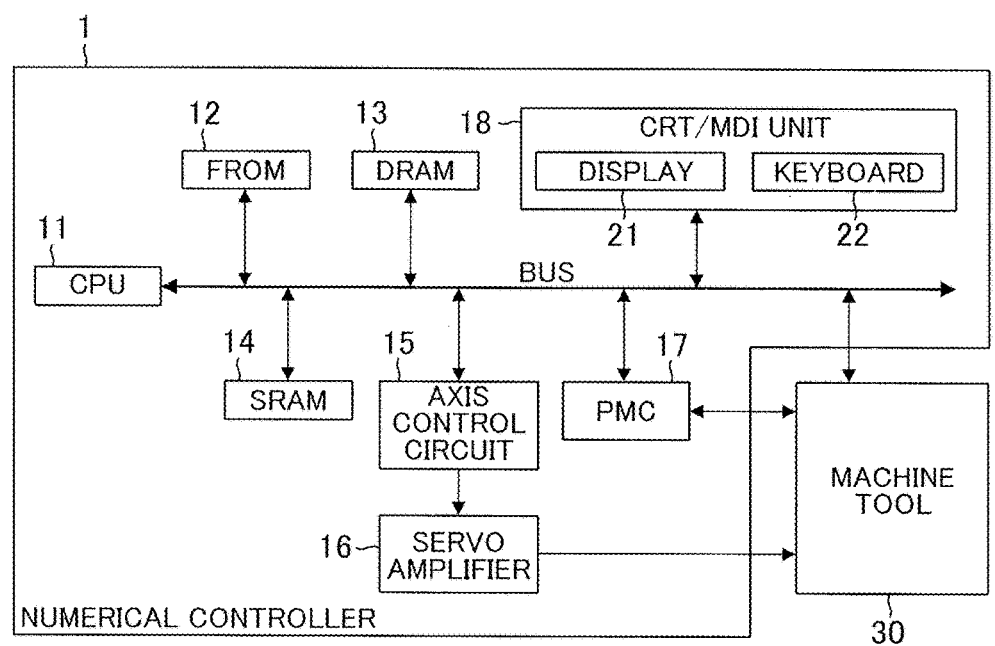
FIG. 4 is a block diagram illustrating main parts of the numerical controller according to an embodiment of the present invention.

FIG. 4 is a block diagram illustrating main parts of the numerical controller according town embodiment of the present invention.

A numerical controller 1 includes a CPU 11 which controls the entire numerical controller 1. The CPU 11 is connected, through a bus, to a flash ROM 12, a DRAM 13, a SRAM 14, an axis control circuit 15, a PMC 17, and a CRT/MDI unit 18.

A system program for controlling the entire numerical controller 1 is stored in the flash ROM 12, and a machining program which is used by the numerical controller 1 to control a machine tool 30 is stored in the DRAM 13. The machining program is generally stored in the SRAM 14 of a nonvolatile type, and read from the SRAM 14 and stored in the DRAM 13 when it is executed. Then, the CPU 11 sequentially executes the machining program while reading the machining program from the DRAM 13 so as to control the axis control circuit 15, and controls the machine tool 30 through a servo amplifier 16.

In addition, the PMC (programmable machine controller) 17 controls auxiliary devices of the machine tool according to a sequence program built in the numerical controller 1.

The CRT/MDI unit 18 includes a display 21 which displays status information and information related to machining statuses of the numerical controller 1, and a keyboard 22 which receives an operation of an operator.

An example of a partial correction function of the tool path (the cutting condition) in the machining cycle installed in the numerical controller 1 provided with the configuration illustrated in FIG. 4 will be described below.

Figure 5:
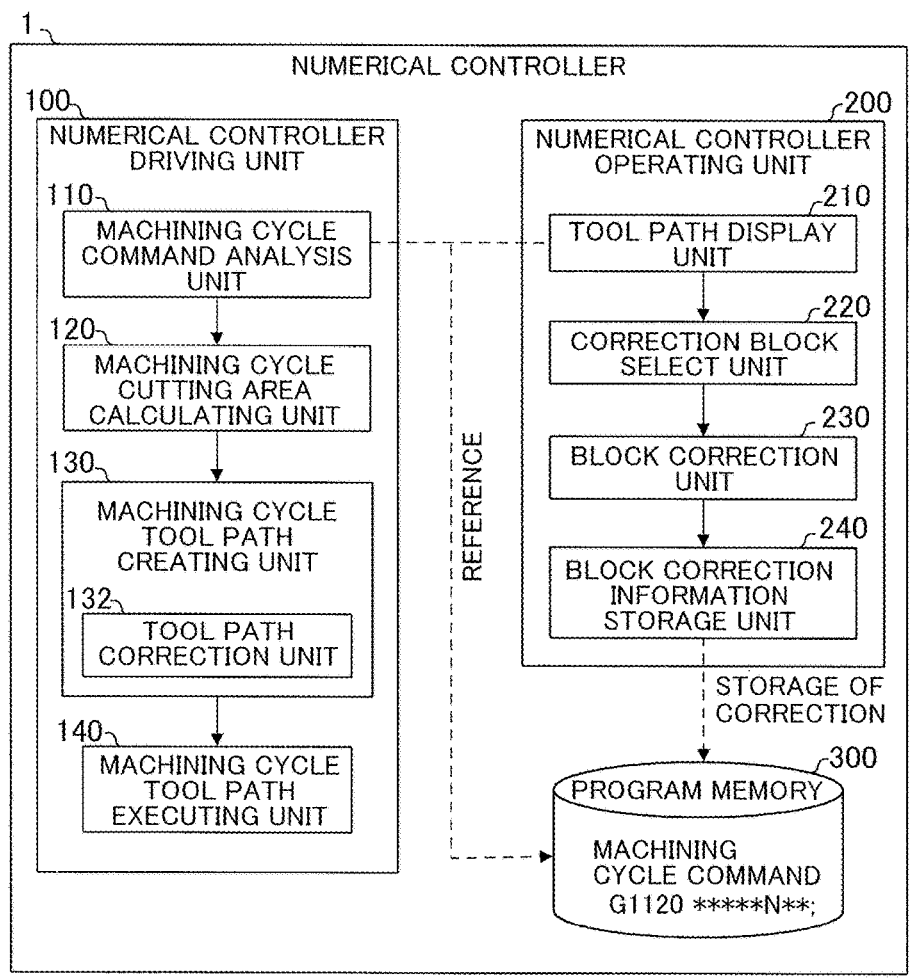
FIG. 5 is a functional block diagram of the numerical controller according to an embodiment of the present invention.

FIG. 5 is a functional block diagram of the numerical controller according to an embodiment of the present invention.

The numerical controller 1 includes a numerical controller driving unit 100, a numerical controller operating unit 200, and a program memory 300. The numerical controller driving unit 100 is a functional unit to control the driving operation of the numerical controller 1, and includes a machining cycle command analysis unit 110, a machining cycle cutting area calculating unit 120, a machining cycle tool path creating unit 130, and a machining cycle tool path executing unit 140.

The machining cycle command analysis unit 110 reads the block from the machining program with reference to the program memory 300, and analyzes a command included in the read block. In addition, in a case where the machining cycle generation command is contained in the analyzed command, the machining cycle command analysis unit 110 commands the machining cycle cutting area calculating unit 120 to calculate a cutting area.

The machining cycle region calculating unit 120 calculates a part shape to be formed by the machining cycle, based on argument data of the machining cycle generation command read by the machining cycle command analysis unit 110, and determines a cutting area based on the calculated part shape.

The machining cycle tool path creating unit 130 creates the tool path for each block based on the cutting area determined by the machining cycle cutting area calculating unit 120. A series of blocks created by the functional unit can be expressed as the ISO code program as illustrated in FIG. 9.

In addition, the machining cycle tool path creating unit 130 includes a tool path correction unit 132 as a sub-functional unit. In a case where block correction information is contained in the machining cycle generation command read by the machining cycle command analysis unit 110, the tool path correction unit 132 corrects the tool path in the block designated by the block correction information when the machining cycle tool path creating unit 130 creates the block of the tool path.

Then, the machining cycle tool path executing unit 140 controls the machine tool 30 based on the tool path created by the machining cycle tool path creating unit 130, and performs the machining by the machining cycle.

The numerical controller operating unit 200 is a functional unit to perform partial correction in response to the machining cycle generation command, and includes a tool path display unit 210, a correction block select unit 220, a block correction unit 230, and a block correction information storage unit 240.

The tool path display unit 210 reads the machining program with reference to the program memory 300, calculates a tool path of a tool controlled by the read machining program, and displays the tool path in the display 21 as a drawing check screen. Further, a calculation process of the tool path is the same process as those performed in the machining cycle command analysis unit 110, the machining cycle cutting area calculating unit 120, and the machining cycle tool path creating unit 130.

The correction block select unit 220 selects a block that is selected from the tool path displayed in the display 21 of the tool path display unit 210 by an operator using an input device such as the keyboard 22, as a correction target block. Besides the keyboard 22, a pointing device such as a mouse or a touch panel may be used as the input device.

The block correction unit 230 receives the operator's correction with respect to the block selected by the correction block select unit 220, and creates the correction information on the block. In the input of correction, a correction window for the end point coordinates of the designated block may be displayed as illustrated in FIG. 3 to prompt the operator to input the coordinates, or the operator may directly correct the path on the screen using the pointing device or the like. In addition, for example, as illustrated in FIG. 2, a plurality of tool paths may be further inserted after the correction target block by continuously inputting a plurality of coordinates.

Figure 3:
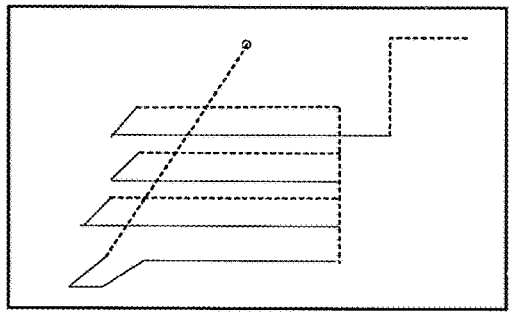
FIG. 3 is a diagram illustrating an operation outline of a partial correction work of the machining cycle which is performed by the numerical controller according to the present invention.
Figure 3:
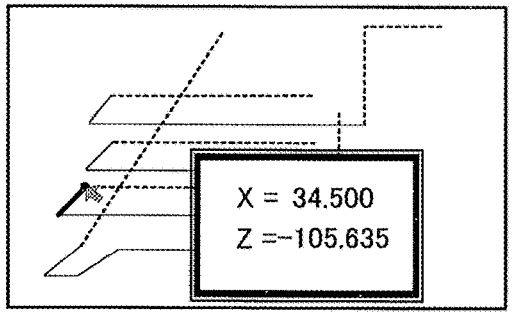
Figure 3:
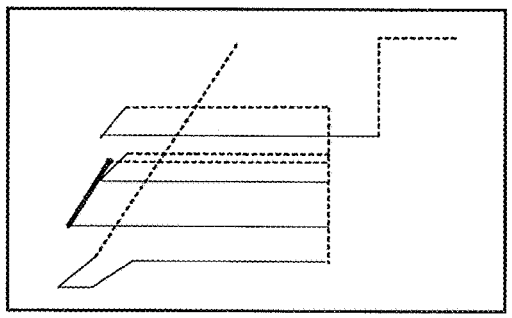

The correction information created by the block correction unit 230 includes a block number of the correction target block and one or more coordinate values as the underlined part in "Block of roughly turning cycle after correction" of FIG. 3. In a case where the correction content corresponds to a correction of the end point coordinates of the block, the coordinate values are expressed by a set of coordinate values like (X1: ○○, Z1: xx). In a case where the correction content corresponds to a correction of inserting a plurality of tool paths after the block, the coordinate values are expressed by a plurality of sets of consecutive coordinate values like (X1: ○○, Z1: xx, X2: ΔΔ, Z2: □□, ... ).

The block correction information storage unit 240 inserts the correction information created by the block correction unit 230 in the machining cycle generation command of the correction target, and stores the corrected machining cycle generation command in the program memory 300. When the correction information is inserted, the coordinate values of the correction information may be inserted in a format of comment as illustrated in FIG. 3. Further, the entire correction information may be inserted as a format of comment.

Figure 6:
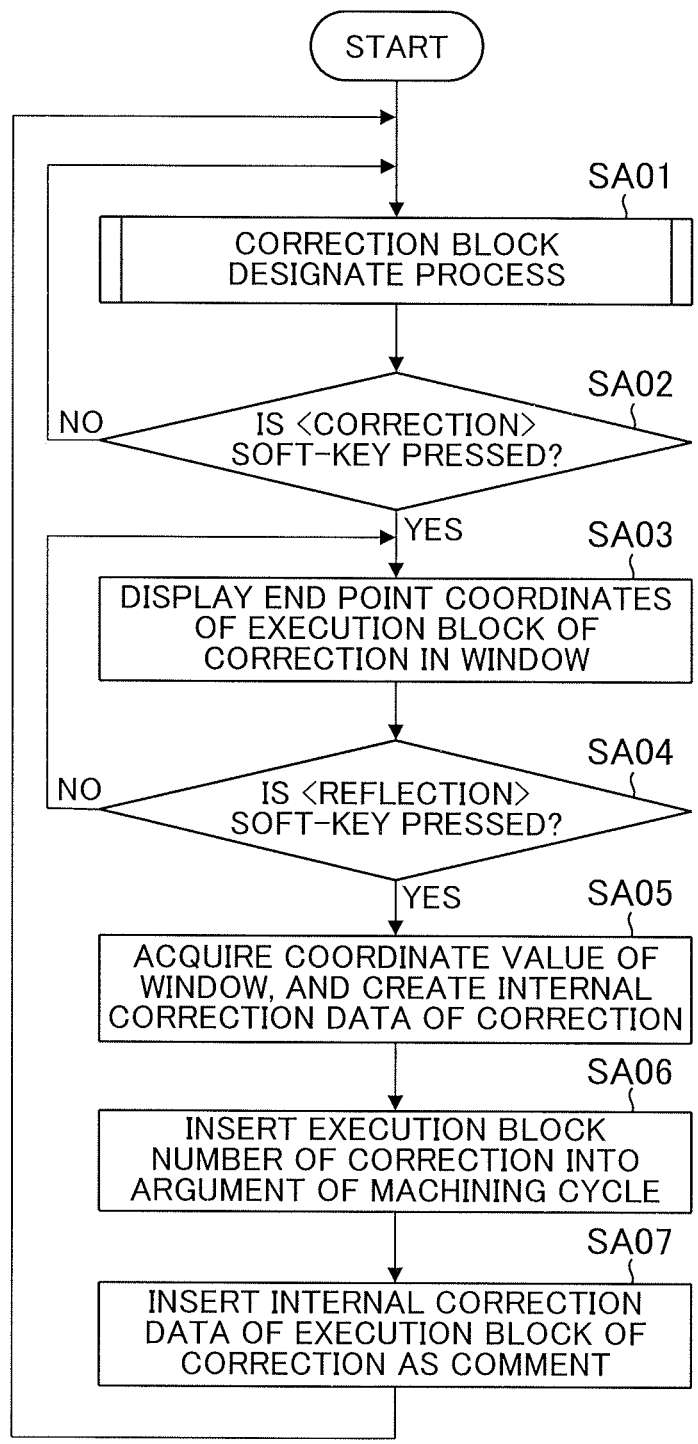
FIG. 6 is a flowchart of an example of the partial correction process of the machining cycle which is performed by a numerical controller operating unit of the numerical controller of FIG. 5.

FIG. 6 is a flowchart of processes performed by the correction block select unit 220, the block correction unit 230, and the block correction information storage unit 240 in the drawing check screen. The flowchart shows a process in a case where the end point coordinates of a correction target block are corrected.

[Step SA01] An input of the block designated by the operator is received through the CRT/MDI unit 18.

[Step SA02] It is determined whether or not the operator presses the <Correction> soft-key. If the <Correction> soft-key is pressed, the block designated in Step SA01 is selected as a correction block, and the procedure proceeds to Step SA03, and if not, the procedure returns to Step SA01.

[Step SA03] The endpoint coordinates of the correction block selected in Step SA02 are displayed in the window on the display 21, and the coordinate input from the operator is received.

[Step SA04] It is determined whether or not the operator presses the <Reflection> soft-key. If the <Reflection> soft-key is pressed, the procedure proceeds to Step SA05, and if not, the procedure returns to Step SA03.

[Step SA05] The coordinate value thus input in the window is acquired, and internal correction data of the correction block is created.

[Step SA06] An execution block number of the correction block is inserted to an argument of the machining cycle.

[Step SA07] The internal correction data of the correction block is inserted as a comment and stored in the program memory 300, and the procedure returns to Step SA01.

Figure 7:
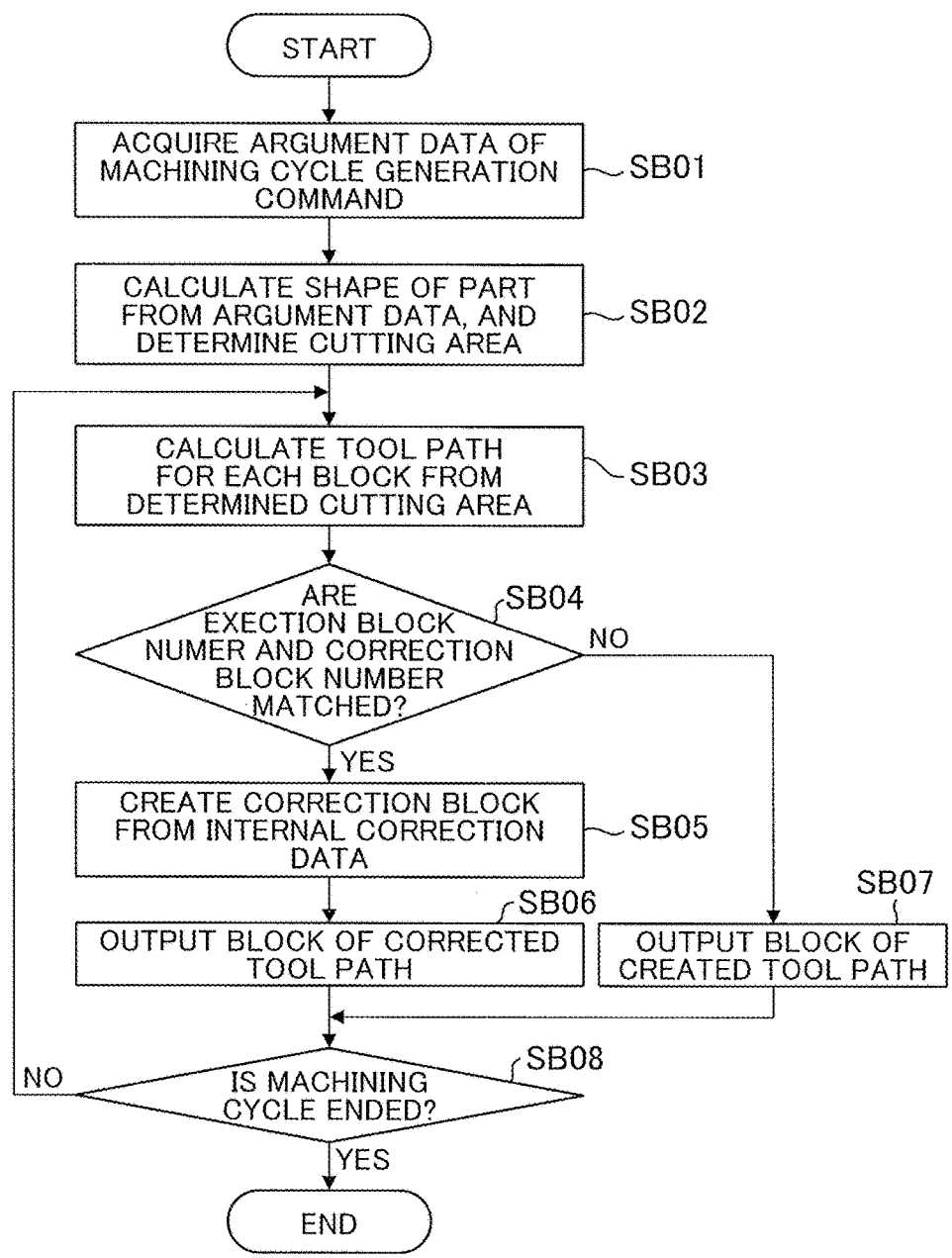
FIG. 7 is a flowchart of a generation/execution process of the machining cycle based on correction information which is performed by the numerical controller driving unit of the numerical controller of FIG. 5.

FIG. 7 is a flowchart of a generation/execution process of the machining cycle based on the correction information which is executed by the numerical controller driving unit 100.

[Step SB01] The machining cycle command analysis unit 110 analyzes the machining cycle generation command, and acquires argument data.

[Step SB02] The machining cycle cutting area calculating unit 120 calculates the shape of a part by the machining cycle based on the argument data of the machining cycle generation command acquired in Step SB01, and determines a machining region based on the calculated shape of the part.

[Step SB03] The machining cycle tool path creating unit 130 creates the tool path for each block based on the cutting area determined in Step SB02.

[Step SB04] It is determined whether or not the execution block number of the block created in Step SB03 and the block number of the correction information inserted into the machining cycle generation command analyzed in Step SB01 are matched with each other. If both block numbers are matched, the procedure proceeds to Step SB05, and if not, the procedure proceeds to Step SB07.

[Step SB05] The internal correction data is acquired from the correction information inserted into the machining cycle generation command analyzed in Step SB01, and a block of the corrected tool path is created based on the acquired internal correction data.

[Step SB06] The block of the tool path corrected in Step SB05 is output, and the procedure proceeds to Step SB08.

[Step SB07] The block created in Step SB03 is output as an execution block, and the procedure proceeds to Step SB08.

[Step SB08] It is determined whether or not the machining cycle is ended. If the machining cycle is not ended, the procedure returns to Step SB03, and if ended, the machining cycle is ended.

In the above embodiment, the correction portion in the drawing check screen is designated and corrected at the time of machining simulation. However, the numerical controller of the present invention can be configured to designate the correction portion in the middle of actually executing the machining cycle.

In the following, the description will be made about another example in which the correction is partially performed at the time of executing the machining cycle.

Figure 8:
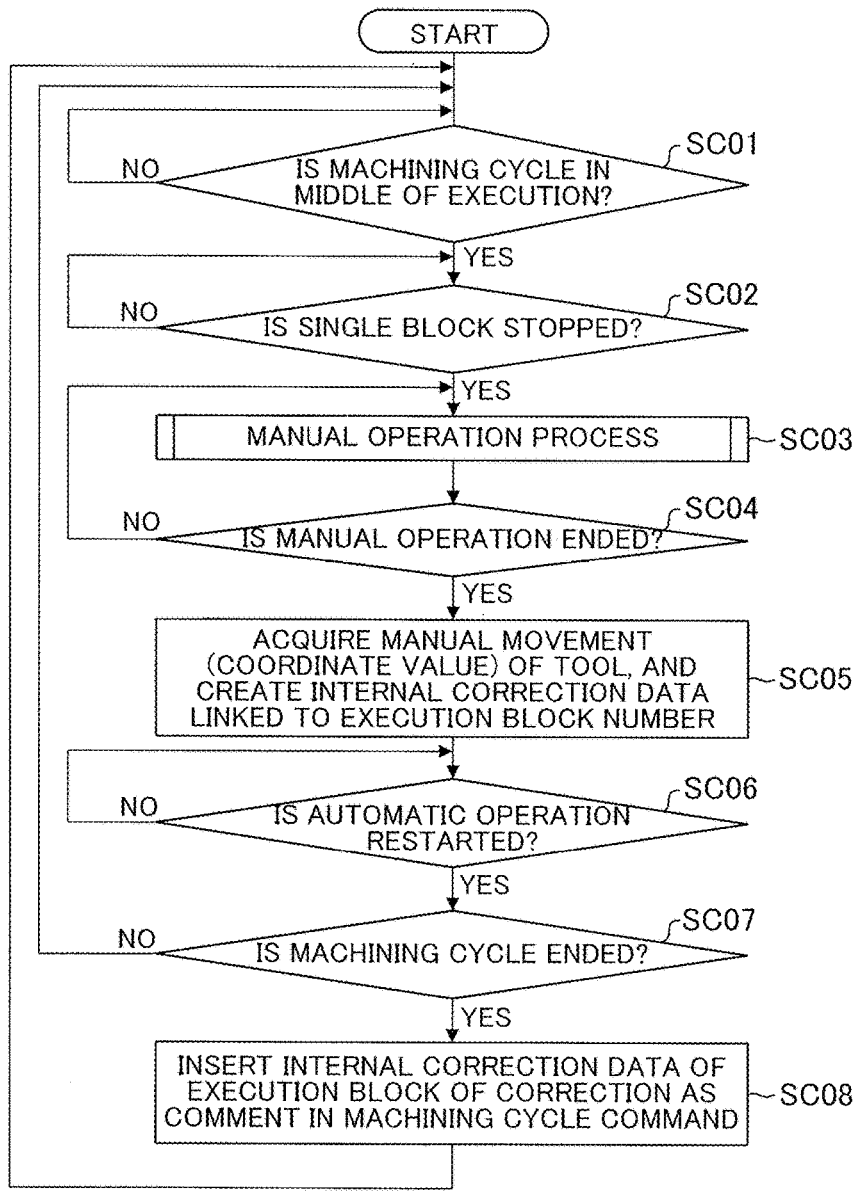
FIG. 8 is a flowchart of another example of the partial correction process of the machining cycle which is performed by the numerical controller operating unit of the numerical controller of FIG. 5.

FIG. 8 is a flowchart of processes performed by the correction block select unit 220, the block correction unit 230 (using a manual driving), and the block correction information storage unit 240 in a machining program executing screen. The flowchart shows a process in a case where the end point coordinates of the correction target block are corrected.

[Step SC01] It is determined whether or not it is in the middle of execution of the machining cycle. If it is in the middle of execution of the machining cycle, the procedure proceeds to Step SC02, and if not, the determination process of this step is repeatedly performed.

[Step SC02] It is determined whether or not a command of stopping a single block is issued by the operator. In a case where the command of stopping a single block is issued, the procedure proceeds to Step SC03, and if not, the determination process of this step is repeatedly performed.

[Step SC03] A manual operation is received from the operator, and the tool is moved.

[Step SC04] It is determined whether or not an end command of the manual operation by the operator is received. If the manual operation is ended, the procedure proceeds to Step SC05, and if not, the procedure returns to Step SC03.

[Step SC05] A manual movement (coordinates) of the tool is acquired, and the internal correction data linked to the number of execution blocks (the block number of the block stopped in Step SA02) is created.

[Step SC06] It is determined whether or not a command of restarting an automatic operation is issued. If the restarting command is issued, the automatic operation is restarted and the procedure proceeds to Step SC07, and if not, the determination in this step is repeatedly performed.

[Step SC07] It is determined whether or not the machining cycle is ended. If the machining cycle is ended, the procedure proceeds to Step SC08, and if not, the procedure returns to Step SC01.

[Step SC08] The execution block number of the correction block is inserted to the argument of the machining cycle generation command, and the internal correction data of the correction block is inserted as a comment and stored in the program memory 300, and the procedure returns to Step SC01.

Further, the flowchart of the generation/execution process of the machining cycle based on the correction information which is executed by the numerical controller driving unit 100 in this embodiment is the same as that of FIG. 7, and the description thereof is not be repeated.

Hitherto, the description has been made about the embodiments of the present invention, but the invention is not limited to the exemplary embodiments described above. Other embodiments may be implemented by appropriately modifying the configurations.

The invention claimed is:

1. A numerical controller that generates a machining cycle configured by a plurality of blocks in response to a machining cycle generation command of a machining program, and controls a machine tool by executing the machining cycle, the numerical controller including a memory and a processor, the processor configured to perform a method comprising:
    selecting, from among the plurality of blocks of the machining cycle, a block to be corrected based on an operator selection of a tool path to be corrected;
    correcting the selected block based on a correction received from an operator;
    generating correction information of the block based on the correction received from the operator without unfolding the machining cycle into a code program; and
    storing the correction information of the block,
    wherein the machining cycle is generated based on the correction information of the block and the machining cycle is executed to control the machine tool.

2. The numerical controller according to claim 1, wherein the processor is configured to perform a method comprising:
    selecting the correction block from an operator input to a screen where a machining path based on the machining cycle is drawn.

3. The numerical controller according to claim 2, wherein the processor is configured to perform a method comprising:
    correcting an end point coordinate value of the selected block based on a coordinate value instructed by a manual operation.

4. The numerical controller according to claim 2, wherein the processor is configured to perform a method comprising:
    correcting an end point coordinate value of the selected block based on a coordinate value designated on a screen where a machining path based on the machining cycle is drawn.

5. The numerical controller according to claim 2, wherein the processor is configured to perform a method comprising:
    correcting a cutting condition of the selected block based on an input value of a cutting condition acquired by a key input.

6. The numerical controller according to claim 2, wherein the correction information of the block includes block identification information for identifying the block, and the correction information of the block is inserted into an argument of the machining cycle generation command.

7. The numerical controller according to claim 1, wherein the processor is configured to perform a method comprising:
    selecting the block stopped by a single block in the middle of execution of the machining cycle, as the correction block.

8. The numerical controller according to claim 7, wherein the processor is configured to perform a method comprising:
    correcting an end point coordinate value of the selected block based on a coordinate value instructed by a manual operation.

9. The numerical controller according to claim 7, wherein the processor is configured to perform a method comprising:

correcting an end point coordinate value of the selected block based on a coordinate value designated on a screen where a machining path based on the machining cycle is drawn.

10. The numerical controller according to claim 2, wherein the processor is configured to perform a method comprising:
   correcting an end point coordinate value of the selected block based on a coordinate value acquired by a key input.

11. The numerical controller according to claim 7, wherein the processor is configured to perform a method comprising:
   correcting an end point coordinate value of the selected block based on a coordinate value acquired by a key input.

12. The numerical controller according to claim 7, wherein the processor is configured to perform a method comprising:
   correcting a cutting condition of the selected block based on an input value of a cutting condition acquired by a key input.

13. The numerical controller according to claim 7, wherein the correction information of the block includes block identification information for identifying the block, and the correction information of the block is inserted into an argument of the machining cycle generation command.

14. The numerical controller according to claim 1, wherein the processor is configured to perform a method comprising:
   correcting an end point coordinate value of the selected block based on a coordinate value instructed by a manual operation.

15. The numerical controller according to claim 1, wherein the processor is configured to perform a method comprising:
   correcting an end point coordinate value of the selected block based on a coordinate value designated by an operator on a screen where a machining path based on the machining cycle is drawn.

16. The numerical controller according to claim 1, wherein the processor is configured to perform a method comprising:
   correcting an end point coordinate value of the selected block based on a coordinate value acquired by a key input.

17. The numerical controller according to claim 1, wherein the processor is configured to perform a method comprising:
   correcting a cutting condition of the selected block based on an input value of a cutting condition acquired by a key input.

18. The numerical controller according claim 1, wherein the correction information of the block includes block identification information for identifying the block, and the correction information of the block is inserted into an argument of the machining cycle generation command.

\* \* \* \* \*